United States Patent [19]

Anstadt et al.

[11] 4,141,944
[45] Feb. 27, 1979

[54] PROCESS FOR THE PRODUCTION OF IMITATION WOOD FROM SYNTHETIC RESINS

[75] Inventors: Gerd L. Anstadt; Helmut Kesseler, both of Pirmasens, Fed. Rep. of Germany

[73] Assignee: Gebrüder Kömmerling Kunststoffwerke G.m.b.H., Pirmasens, Fed. Rep. of Germany

[21] Appl. No.: 781,443

[22] Filed: Mar. 25, 1977

[30] Foreign Application Priority Data

Mar. 29, 1976 [DE] Fed. Rep. of Germany ....... 2613411

[51] Int. Cl.² .......................... B29D 9/02; B32B 3/10; B32B 31/18
[52] U.S. Cl. ................................ 264/45.5; 264/46.1; 264/129; 264/134; 264/139; 264/162; 264/210 R; 264/247; 264/293; 264/321; 264/DIG. 83
[58] Field of Search ..................... 264/46.1, 321, 45.5, 264/293, DIG. 83, 162, 129, 134, 139, 210 R, 247

[56] References Cited

U.S. PATENT DOCUMENTS

| 3,170,974 | 2/1965 | Jacobs | 264/321 X |
| 3,506,749 | 4/1970 | Weissmon | 264/321 X |
| 3,563,839 | 2/1971 | Divis | 264/321 X |
| 3,641,228 | 2/1972 | Fleck | 264/225 X |

Primary Examiner—Thomas P. Pavelko
Attorney, Agent, or Firm—Michael J. Striker

[57] ABSTRACT

A process is provided for producing an imitation wood workpiece by forming a synthetic resin workpiece having a cellular plastic core and a densified covering layer after extruding and solidifying synthetic resin and thereafter imparting an appearance of wood grain to the synthetic resin workpiece by heating the densified covering layer of the workpiece and by relief embossing texture furrows in portions of the densified covering layer.

14 Claims, 2 Drawing Figures

PROCESS FOR THE PRODUCTION OF IMITATION WOOD FROM SYNTHETIC RESINS

BACKGROUND OF THE INVENTION

Foamed synethetic resin materials in which a foamed core blends in the outward direction into outer layers, which are densified relative to a foamed core, are well known. The densified outer layers consist of the same synthetic resin as the foamed core. These outer layers can be densified almost up to the theoretical maximum density of the material. These cellular synthetic resins are referred to as "structural foam material" or "integral foam material".

It is known to produce synthetic resin materials as imitation wood. A sheet of synthetic resin is brought to an elevated temperature, for example, by means of surface heating and fine furrows are embossed in the surface of the material by a cold embossing instrument, such as a press die or an embossing roller. In this way, the texture or grain of wood is to be imitated. The embossing of the texture furrows produces difficulties. In general, the required embossing pressure is so large that no sufficiently uniform embossing pattern can be obtained, especially if the plastic to be embossed has a thickness beyond normal sheet thickness. Specifically, the heating of such a plate or sheet cannot be made to proceed so far that the thermoplastic synthetic resin is sufficiently softened for use of a low embossing pressure, because there would then be a danger that the material during the application of the embossing force, if not before, would cave in, become warped or deformed—especially if the material is a plate with a hollow profile. Hollow-profile plates are not sufficiently capable of retaining their overall flatness in such circumstances.

Plates of imitation wood have already been produced out of structural or integral foam. Flow lines are produced during the simultaneous production of the foamed core and the densified outer layers. The flow lines, which are intended to imitate wood grain, are produced in the outer surface of the densified outer layers. The production of the flow lines includes pigmenting and controlling the feeding head and the manner of casting.

In contrast to castings made of homogeneous plastic, imitation wood integral foam castings have the advantage that the specific gravity and the material-working properties are quite similar to those of wood itself. Accordingly, such integral foam cast bodies can be planed, milled, cut, drilled, bolted and nailed without cleaving or splitting the material. However, in the case of injection molding, the shapes of the flow lines cannot be controlled such that the flow lines actually look like true wood grain. Also, the flow lines do not have the three-dimensional character of the fine furrows of natural wood. Therefore, the known imitation wood plates are readily perceivable as being imitations. Additionally, such imitation wood plates do not have the feel of wood.

To eliminate these disadvantages, it has also been proposed that imitation wood beams and the like be molded using molds whose surfaces have a texture resembling that of natural wood. Such imitations look deceptively similar after a suitable staining. However, the cost of production is great. Also, disadvantageously, all the articles produced have identical shape and size.

SUMMARY OF THE INVENTION

It is the primary object of the present invention to avoid the disadvantages of the prior proposals by providing a process for the production of a wood-like article, especially a flat bar consisting of thermoplastic synthetic resin, having a foamed core and outer layers densified by comparison to the core. At least one of the outer layers is provided on its outer surface with texture furrows resembling those of grained wood. A workpiece is produced of thermoplastic synthetic resin having a foamed core and relatively densified outer layers.

The inventive process is distinguished from the above-mentioned art by its lower costs, particularly by the low cost of the apparatus for performing the inventive process, the freedom with which the length of the workpiece can be selected and the good wood-like appearance of the workpiece. According to the inventive process, a bar having outer layers with a smooth outer surface is formed by extrusion. After solidification of the synthetic resin and its outer layers, texture furrows like those of wood are relief embossed in the outer surface of at least one of the outer layers, utilizing heating action in the process.

According to the inventive process, first an integral foam member, such as a board, is extruded with even or smooth outer surfaces of the outer layers. Suitable methods for the extrusion are known and can be used. Particularly, plastic incorporating a foaming agent can be held in a suitable extruder in which the interior of the extruder is under sufficiently great pressure so that the plastic does not foam inside the extruder. The plastic is extruded in such a way that the outer layers are quickly cooled and solidified by contact with a calibrator and cooling device connected at the outlet side of the extruder. Because of the speed of the cooling and solidification, there is hardly any foaming in the zone of the outer layers or any liberation of the foaming agent. However, the synthetic resin in the interior of the board is foamed.

The preferred synthetic resin is polyvinylchloride. The smooth outer layers of the extruded member are then relief embossed to correspond with the desired texture of wood. It has been shown that, due to the inventive use of integral foam material, a surprisingly good embossing can be achieved. With this embossing, the surface structure of wood can be simulated very realistically. Recesses corresponding to conversely shaped protruding formations on the embossing instrument are formed in the embossed material through relief embossing. The outer layers are sufficiently capable of retaining their overall flatness because of the presence of the foamed core; therefore, the outer layers do not cave in or undesirably deform under the embossing pressure. Also, the outer surfaces to be embossed can be fashioned using a relatively low embossing pressure because the outer layer of the article of integral foam material is still porous to a certain degree.

Aside from a very thin, substantially solid outer skin, the outer layer to be emobossed likewise has to at least a certain extent a cellular structure, or can be positively caused to have a cellular structure by suitably establishing the process condition. Therefore, the relief embossing causes pores located in the vicinity of the texture furrows to break open outwardly; consequently, the surfaces at the bottoms and the flanks of the texure furrows are more or less porous and rough. The similarity of the appearance of the synthetic resin member to the appearance of wood is considerably improved by such a roughening, because the texture furrows of wood likewise are rough themselves. With the inventive relief embossing, the outer skin of the outer layer is pierced so that the structural areas of the covering layer situated under the outer skin are exposed.

For the inventive relief embossing, it is possible to heat the outer side to be embossed as a whole to a defined depth, and then to emboss with a cold embossing instrument. However, the heating temperature is upwardly limited because otherwise there is a risk that the foaming agent, which due to the basic production process remains confined in the outer layer, might cause an undesirable expansion of the outer pores. Therefore, it is preferred to only locally soften the material of the outer surface to be embossed to a limited depth suitable for the character of the texture and to outwardly displace the softened material during the formation of the texture furrows by means of the embossing instrument. The portions of the surface of the outer layer that are not to be embossed are therefore preferably kept as cold as possible, and are in no event heated up to the softening temperature. However, because of the heating up of portions of the outer layer by means of localized heating, the amount of foaming agent liberated even in the worst case is small, so that excessive foaming does not occur even in the vicinity of the texture furrows. Rather, a limited foaming of the softened zones of the outer layer in the vicinity of the texture furrows is much more advantageous because the previously closed pores at the surfaces of the texture furrows break open, resulting in additional roughness.

The preferred inventive localized plasticization of the texture furrows can be accomplished using an embossing device. A suitable device would have protruding relief formations which would be heated to a temperature above the softening temperature of the material of the outer layer, with the matrix surface portions of the embossing surface between the projecting relief formations being kept at a lower temperature. Therefore, even when the matrix comes into contact with the outer side of the outer layer, the corresponding zones of the outer side would not be heated to above the softening temperature.

However, it is preferred that the matrices between the projecting relief formations be kept from contact with the outer side of the outer layer to be embossed. Instead, the matrix should be more or less spaced from the outer side. An embossing process in which only the projecting relief formations penetrate into the material to be embossed has the advantage that the entire embossing apparatus can be maintained at essentially single temperature, with the non-contacting, spaced matrix portions between the projecting formations being unable to heat the corresponding surface portions of the material to a temperature beyond the softening temperature of the material. Frequently, a small spacing of a few tenths of a millimeter will suffice for the inventive process. Additionally, the embossing rate can be so regulated that the period of time in which the surface portions which are not to be embossed and the corresponding matrix portions between the projecting relief formations of the device face each other is too short for a heating of this part of the surface to beyond the the softening temperature.

As an embossing device, a flat plate or an embossing cylinder can be used. An embossing cylinder is preferable because it allows continuous embossing and permits a high speed of embossing.

According to the preferred inventive proposal with only the projecting relief formations coming into contact with the material to be embossed and with more or less sizable gaps being maintained to either side of each projecting formation relative to the outer side of the outer layer to be embossed, the similarity of the inventively obtained texture is still further improved with respect to the texture of wood. At the outer edges of the texture furrows, irregular crater edge portions can be formed by outward displacement of material outwardly beyond the outer surface of the densified outer layer. The appearance of the surface of the workpiece can very closely approximate the relatively fissured and grooved texture of wood as a result of such ridge-like outer edges of the texture furrows. A desirably extensive irregularity of these ridges can be promoted through the breaking open of foaming-agent-containing pores in the ridges. For example, through the inventive process, an integral foam plank is produced which can hardly be distinguished from a genuine oak plank. Such an imitation wood plank is particularly suitable for imitation wood overhead beams as well as for other wood imitations including wall cladding panels, railings and the like.

The outwardly projecting ridges can however also be lightly sanded to match the imitiation to the particular kind of wood to be imitated. If desired, the imitation can be sanded smooth.

If the foamed material does not have the desired wood color, then the extruded material is preferably primed with a first coat. This can precede or follow the embossing. Additional color effects can be imprinted on the material.

It is preferred to fix the primer and, if desired, the imprinted coloring by means of a suitable lacquer; preferably, the lacquer is transparent and is brushed or sprayed on. This coating lacquer can include ultra violet absorbents for increasing the resistance to weather. The coating lacquer and preferably also the other colors should naturally be resitant to weathering.

If desired, the inventively produced wood can be darker in the interior of the texture furrows than on the surrounding surface zones. For example, the surfaces of the texture furrows can be pigmented after relief embossing; a darker coloring material such as carbon black or a carbon black paste can be rubbed in.

In another refinement of the invention, the darker texture furrows can be contrasted against a bright surrounding surface by using an integral foam workpiece made out of a suitably dark material, for example, through the addition of suitable color pigments to the synthetic resin when at the outset the synthetic resin does not already have the desired color in its hardened condition. The outer side to be embossed of the integral foam workpiece will then be further coated with a layer of lacquer before the relief embossing. The lacquer will have a bright color which will be preserved upon the surface zones between the texture furrows after embossing. After the solidification, the embossing surface projections penetrate through this layer of lacquer so that the bright coloring is interrupted at the location of the texture furrows and the color of the dark base material becomes visible once again.

The suitable coloring can also be pressed into the relief embossed texture furrows. Of course, this requires corresponding matching of the employed coloring press to the surface structure. However, this is possible nowadays.

Additionally, augmented coloring effects can be obtained through supplementary pigmentation of the texture furrows through their print impression or through covering with a suitable layer of lacquer which is embossed through if it is desired that the texture furrows appear differently colored than the color of the surrounding surface zones. For example, the texture furrows can be made reddish while the surrounding zones are instead made brown.

If the texture furrows will be supplementarily pigmented, it is advantageous that the material used for the production of the basic workpiece have, as far as possible, the natural color of the wood to be imitated.

The depth of the texture furrows is generally quite small. A depth of a few tenths of a millimeter is enough —although greater furrrow depths could be produced. With the preferred localized melting out of the texture furrows, the temperature and the embossing rate, which determine the duration of the penetration of the relief formations into the smooth outer layer, is preferably so selected that for the most part heating of the material of the outer layer to above the softening temperature is limited to a depth corresponding approximately to the depth of the furrows to be produced.

With the invention, it is possible to obtain a superior imitation wood for the production of housings, cladding, furniture, staircase railings, imitation overhead beams and the like. The same finishing processes applied to wood can also be applied to the textured integral foam imitation. Also the stability and rigidity of the integral foam workpiece is great on account of the dense outer layers. The specific gravity of the inventively produced workpiece can be extensively varied. Moreover, excellent heat and sound isolating properties are present because of the integral foam structure.

The inventive workpiece can also be made as a hollow profile. This reduces weight and also the amount of material required. However, in order to avoid deformation which could result from embossing, preferably the hollow portions of the profiled cross section is not greater than about 50% of the total cross section. If desired, the peripheral surface of the hollow interior can be bounded by suitably densified layers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTON OF THE DRAWINGS

FIG. 1 is a perspective view of an imitation wood workpiece produced in accordance with the invention; and FIG. 2 is a transverse cross-section through the imitation wood workpiece, showing the texture furrows.

DESCRIPTION OF A PREFERRED EMBODIMENT

The preferred embodiment of the inventive process embosses furrows below the general level of a workpiece while raising the walls defining the furrows to ridges above the general level of the workpiece.

Figure 1:
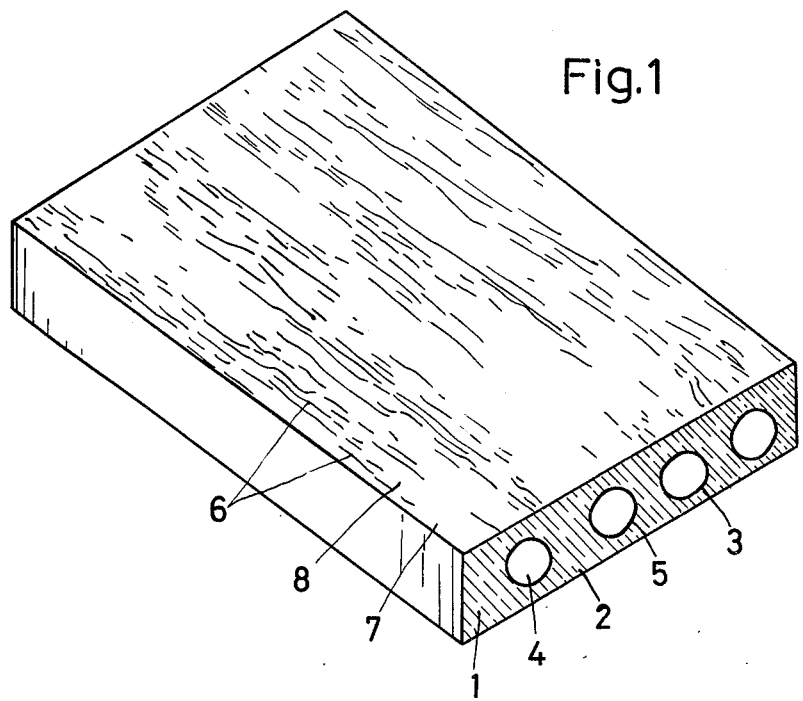

The illustrated board of FIG. 1 is made out of integral foam. That is, the board has an expanded or foamed cellular core 1 which is bounded by outer layers 2. The outer layers 2 are almost unfoamed and therefore have a higher density than the core 1. The outer skin 11 of the outer layer is solid. The outer layers 2 may attain a more or less great densification which may be in the proximity of the density of unfoamed synthetic resin and depends upon the material and process of production employed. In the core 1, the density is generally at least half that of the unfoamed material.

A wide range of materials can be used. Particularly preferred are polyvinylchloride, polystyrene and its impact resistant derivatives, high and low pressure polyethylene, polypropylene, acrylonitrile-butadiene-styrene copolymers, polyurethane, polyester, polycarbonate, an the like.

The inventive method involves first producing an integral foam preliminary workpiece such as described above. This can for example preferably be done using the methods disclosed in Federal Republic of Germany Offenlegungsschrift No. 1,729,076 or Federal Republic of Germany Offenlegungsscrift No. 1,913,921, but could in principle be done using other methods, including conventional methods of the general type in question.

Such methods can produce a flawless workpiece with, for example, a rectangular profile as is often required for imitation wood boards.

Such as imitation wood board can, as illustrated in FIG. 1, also have cylindrical hollow channels 4 extruded with the core 1 and likewise bounded by densified layers 5.

The hollow spaces 4 can be provided to reduce the weight of the workpiece. However, they should not constitute more than 50% of the entire cross section of the profile.

The texture provided upon the outer surface of the workpiece corresponds in FIG. 1 to oak wood. This texture is produced through the relief embossing of texture furrows 6 in the upper outer side 7 of the upper outer layer 2. These furrows 6 lie in a smooth surface 8, which essentially constituted the external surface structure of the workpiece after its extrusion.

In FIG. 1, the remaining outer surfaces of the workpiece are untextured. However, these surfaces can also be furnished with suitable texture furrows.

The relief embossing of the texture furrows takes place by means of an embossing apparatus such as an embossing plate or preferably an embossing cylinder. Only the reliefed formations of the embossing apparatus come into contact with the workpiece; the matrices between the relief formations are kept at a predetermined distance from the external surface zones 8 of the workpiece. The heatable embossing cylinder, which can have a diameter of for example 150 mm., carries the reliefed formations in the shape and arrangement of the texture furrows to be embossed. The height of the reliefed formations can for example be three times the depth of the furrows to be embossed since a gap is maintained between the general base level of the cylinder and that of the workpiece. The embossing cylinder is part of an embossing apparatus through which the workpiece is fed only after it is sufficiently cooled. The outer layer 2 is locally heated above the softening temperature only in the region of the texture furrows 6. Therefore, the material at the location of the furrows 6 is softened and is displaced by means of the relief formations. In the areas of the portions to be melted out, an exclusively localized heating to above the softening temperature takes place. But the tempeature is not so high that the material combusts. Also, the softened area extends substantially no deeper than the depth of the produced texture furrows.

Figure 2:
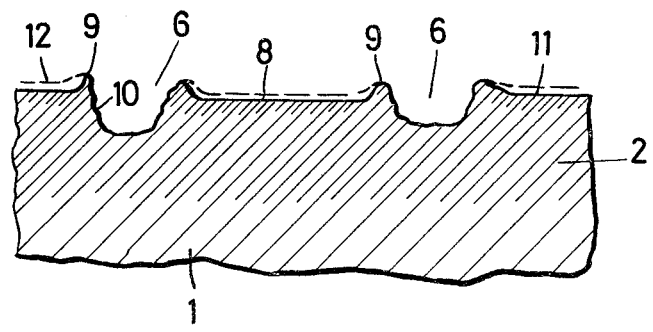

As illustrated in FIG. 2, with such a melting out and embossing of the texture furrows 6, their outer walls 9, which are not in contact with the embossing apparatus, are piled up beyond the level of the upper surface zones 8. Some of the foaming agent is liberated with the melting out of the texture furrows 6 in the densified outer layer 2; consequently, at the region of the surfaces 10 of the texture furrows 6 and of the piled outer walls there occurs some further foaming. As the expanding pores containing the foaming agent burst open, the surfaces 10 become roughened.

The surfaces 10 of the texture furrows 6 can be darkly pigmented if desired so that they visibly contrast with the bordering upper surface zones 8. The embossed surface of the workpiece acquires a feel which is similar to that of wood due to the crater wall-like outer walls. These outer walls can subsequently be sanded over if desired, and could be completely sanded off.

As is further illustrated by FIG. 2, the texture furrows 6 interrupt the substantially solid and thin outer skin 11 of the densified outer layer 2. These furrows extend only slightly into the outer layer 2—for example only to a few tenths of a millimeter. The pores which are already present to a greater or smaller extent in the surfaces 10 of the texture furrows 6 in the outer layer 2, are exposed; the breaking open of these pores likewise contributes to the increased roughness of the surfaces 10.

The depth of the embossing can amount to 0.05 to 1 mm, preferably 0.1 to 0.5 mm. The thickness of the outer layers is preferably about 0.1 to 3 mm, depending on the type of material and the production process employed.

It will be understood that each of the elements described above, or two or more together, may also find a useful application in other types of methods differing from the types described above.

While the invention has been illustrated and described as embodied in a process for the production of imitation wood from synthetic resins, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for producing a workpiece with an imitation wood texture, comprising the steps of forming an integral synthetic resin workpiece having a foamed plastic core and a densified outer layer; heating only spaced portions of the densified outer layer to soften the synthetic plastic material thereof while leaving the remainder of said outer layer unheated; and relief embossing the heated spaced portions to impart to said outer layer the appearance of wood grain, said outer layer including pores of unfoamed foaming agent and the step of heating including softening the outer layer about the pores and heating the foaming agent within the pores to thereby expand the foaming agent and burst the pores whereby the simulated wood appearance is enhanced.

2. A process as defined in claim 1, said step of forming the workpiece being performed by adding foaming agent to synthetic resin while preventing foaming action of the foaming agent prior to the extruding step; extruding the synthetic resin while quickly cooling and solidifying only the outer layer of the synthetic resin, whereby a densified covering layer is formed with hardly any foaming of the foaming agent which is instead confined to pores within the densified covering outer layer, while the interior of the workpiece is foamed to a substantial degree.

3. A process as defined in claim 1, said step of relief embossing being performed while maintaining the foamed core at least substantially free from relief embossing while forming in the densified outer layer pairs of walls having roughened surfaces, each pair of walls defining a furrow.

4. A process as defined in claim 3, the relief embossing being further performed by outwardly displacing synthetic resin in the spaced portions to thereby form crater-wall rigdes defining said furrow in each spaced portion and putting at least a portion of the displaced synthetic resin on top of the walls, rendering thereby the texture rougher, and more wood-like.

5. A process as defined in claim 3, said step of embossing producing furrows having a depth of only a few tenths of a millimeter in the densified covering layer.

6. A process as defined in claim 4, further comprising the step of sanding over said crater-wall ridges.

7. A process as defined in claim 6, further comprising the steps of staining the interior of said furrows and fixing the stain by depositing lacquer in said furrows.

8. A process as defined in claim 6, further comprising the step of applying over said densified covering layer before heating and relief embossing said densified covering layer, a layer of lacquer having a color lighter than that of the material of said densified covering layer, with said relief embossing subsequently penetrating through said layer of lacquer.

9. A process as defined in claim 1, the spaced portions being irregularly separated.

10. A process as defined in claim 1, said step of heating being performed by softening only resin in the spaced portions to a predetermined depth in the densified covering layer while maintaining densified portions intermediate the spaced portions substantially free from softening.

11. A process as defined in claim 10, the densified intermediate portions being at least substantially unheated.

12. A process as defined in claim 11, said step of heating and relief embossing being performed by pressing a heated embossing projection against the spaced portions while maintaining the intermediate portions at least substantially free from contact with the heated projection.

13. A process as defined in claim 12, said step of heating and embossing being performed by providing a embossing tool having a plurality of reliefed formations comprising the heated embossing projection and matrix portions intermediate the reliefed formations, the matrix portions being relatively cool compared with the reliefed formations, and pressing the reliefed formations against and into the spaced portions of the densified covering layer while spacing the matrix portions from the intermediate portions of the densified covering layer.

14. A process as defined in claim 1, said steps of heating and embossing being both performed by using the same instrument, said step of embossing being performed by making a plurality of furrows of different length, width and depth.

* * * * *